June 21, 1966 G. W. CLARK 3,257,537

CIRCUIT PANEL WITH CONTACT PADS

Filed Oct. 21, 1963

INVENTOR
Geoffrey William Clark
By: Kelman and Berman
Agents

United States Patent Office 3,257,537

Patented June 21, 1966

3,257,537

CIRCUIT PANEL WITH CONTACT PADS

Geoffrey William Clark, Bramcote, Beeston, England, assignor to Resources and Facilities Corporation, New York, N.Y., a corporation of Delaware Filed Oct. 21, 1963, Ser. No. 318,775

1 Claim. (Cl. 200—160)

The present invention relates to an improved printed circuit panel. In its more specific aspects, the invention is concerned with a switch including a panel of insulating material overlaid with a sheet of copper stamped to form circuit elements of the stationary portion of the switch, and a switch member movably mounted on the panel to establish selective contact between the circuit elements.

While copper is an excellent conductor, its surface tends to tarnish when in contact with the atmosphere, and the thin layer of corrosion products which constitutes the tarnish significantly increases the contact resistance between the circuit elements and the movable switch member. It has therefore been customary to plate the copper sheet from which the circuit elements are to be stamped with a noble metal, such as gold, palladium, rhodium or heavy silver. This is a very costly procedure because the copper base sheet has to be plated over a relatively large area with the noble metal although only a comparatively insignificant part thereof is utilized as a contact surface, whereby a wastage of expensive noble metal occurs. The object of this invention is to eliminate this wastage.

According to the present invention there is provided a printed circuit panel which may be made by stamping the circuit elements of copper or other inexpensive conducting material, mounting the circuit elements on an insulating support, and then applying to appropriate terminal parts of said circuit elements bi-metal contact pads by a subsequent die stamping operation whereby said pads are affixed over the ends or terminal parts of the circuit elements.

The use of noble metal is limited substantially to the actual size of the pads so that no wastage of expensive metal is involved.

The invention provides a circuit panel in which a plurality of circuit elements are mounted on a base member. The circuit elements consist of a metallic sheet material and have respective terminal portions which are aligned in spaced relationship on the base member, and superposed on associated portions of the latter. Contact pads consist of a conductive sheet material different from the material of the contact elements and having two conductively joined superposed metallic layers. One layer of the material of each pad faces a respective terminal portion and makes electrical contact therewith. The other material layer of the pad constitutes an exposed face of the latter, and faces away from the respective terminal portion and the associated portion of the base member. The pads piercingly engage the associated portions of the base member. The layer which forms their exposed face is of a more noble material than the metallic material of the circuit elements.

The invention also is concerned with printed circuit panels incorporating a circuit with integral stationary switch elements made in accordance with the foregoing method.

Figure 1:
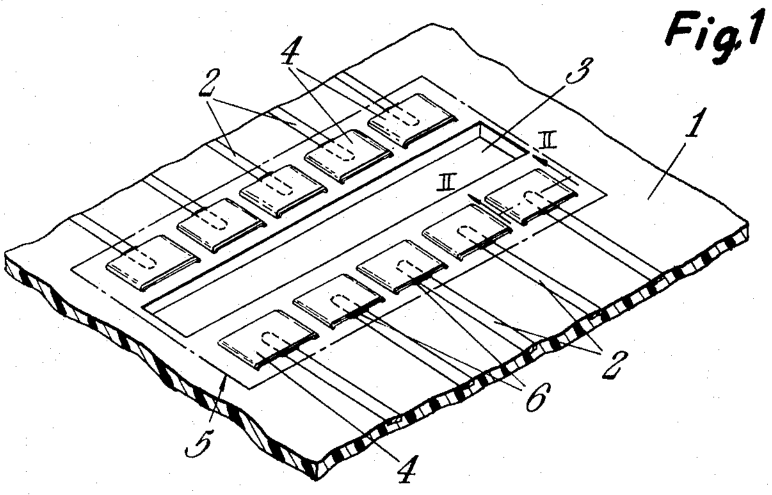
Figure 2:
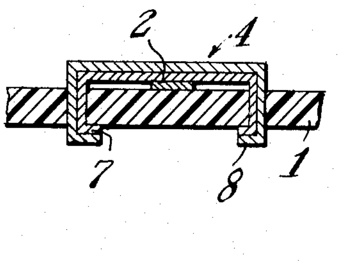

To enable the invention to be clearly understood, a preferred embodiment thereof will now be described by way of example with reference to the accompanying drawing in which FIG. 1 is a fragmentary perspective view of an arrangement in which contact pads applied to the terminal parts of circuit conductors are arranged for cooperation with a sliding switch element, not shown and FIG. 2 illustrates a detail of the arrangement of FIG. 1 in enlarged section on the line II—II.

Referring to the drawing, an insulating supporting panel 1 of insulating material carries die stamped copper circuit conductors 2. The panel 1 is formed with a slot 3 for a sliding switch element, not shown.

The staple shaped bi-metal pads 4 are applied to the terminal parts of the conductors 2 by a single die stamping operation in which the pads are blanked from a strip of bi-metal of a size sufficient to cover the area enclosed by the chain dotted line 5, bent into a shape approximating that of a staple, and crimped about the terminal parts of the conductors 2 and the underlying portion of the insulating panel 1, the panel being pierced by the pads in the attaching operation. The bi-metal strip employed consists of a thickness of copper 7 and an overlay 8 of one of the afore-mentioned noble metals.

The copper face of each pad thus is arranged contiguously opposite the associated conductor 2, and the noble metal face is exposed for contact with the movable switch element, not itself shown in the drawing. It is evident from inspection of the area enclosed by the chain dotted line 5 that a minimum amount of the relatively costly bi-metal strip need be used.

The bi-metal pads 4 are soldered to the terminal parts of the conductors 2 upon assembly as indicated at 6, and overlap the conductors 2 in three directions.

It is to be appreciated that the embodiment illustrated has been described merely by way of example and that the invention is applicable to cases in which a rotary switch member is used, and the bi-metal pads 4 are positioned on the panel 1 in the form of an arc.

Obviously, many modifications and variations of the present invention are possible in the light of the above teachings. It is therefore to be understood that within the scope of the appended claim, the invention may be practiced otherwise than as specifically described.

What is claimed is:

A circuit panel comprising:

(a) a plurality of circuit elements of a first metallic sheet material, each element having a terminal portion;

(b) a base member of insulating material, said circuit elements being mounted on said base member, and the terminal portions of said elements being aligned in spaced relationship and superposed on associated portions of said base member; and (c) a plurality of contact pads of a second conductive sheet material different from said first material, (1) said second sheet material having two conductively joined superposed metal layers, one of said layers of said second material of each pad contiguously facing a respective terminal portion and being in electrical contact therewith, and the other layer constituting an exposed face of said pad and facing away from the respective terminal portion and the associated portion of said base member, (2) said pads each overlapping the associated circuit element, and the overlapping portion of each pad piercingly engaging the associated portion of said base member, and (3) the other layer of said second material being of a metal more noble than the metal of said one layer and than said first metallic sheet material.

References Cited by the Examiner

UNITED STATES PATENTS

| | | |
|---|---|---|
| 2,699,424 | 1/1955 | Nieter. |
| 2,984,595 | 5/1961 | Schumpelt et al. |

ROBERT K. SCHAEFER, *Primary Examiner.*

DARRELL L. CLAY, *Examiner.*

UNITED STATES PATENT OFFICE

CERTIFICATE OF CORRECTION

Patent No. 3,257,537 June 21, 1966

Geoffrey William Clark

It is certified that error appears in the above identified patent and that said Letters Patent are hereby corrected as shown below:

Column 2, line 55, after "associ-" insert -- ated portion of said base member, --.

Signed and sealed this 7th day of April 1970.

(SEAL)
Attest:

Edward M. Fletcher, Jr.
Attesting Officer

WILLIAM E. SCHUYLER, JR.
Commissioner of Patents